(12) United States Patent
Fujino et al.

(10) Patent No.: US 6,308,913 B1
(45) Date of Patent: Oct. 30, 2001

(54) METHOD FOR REDUCING WAVE RESISTANCE IN AIRPLANE

(75) Inventors: Michimasa Fujino; Yuichi Kawamura, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/264,894

(22) Filed: Mar. 9, 1999

(30) Foreign Application Priority Data

Oct. 28, 1998 (JP) .................................................. 10-306991

(51) Int. Cl.[7] ........................................................ B64C 1/38
(52) U.S. Cl. ........................................... 244/45 R; 244/55
(58) Field of Search ............................ 244/55, 130, 1 N, 244/45 R, 35 R, 198, 54 R

(56) References Cited

U.S. PATENT DOCUMENTS

| | | |
|---|---|---|
| 3,727,862 | 4/1973 | Kaufhold et al. . |
| 4,036,452 * | 7/1977 | Schairer . |
| 4,171,786 | 10/1979 | Krenz . |
| 4,311,289 | 1/1982 | Finch . |
| 4,314,681 | 2/1982 | Kutney . |
| 4,447,022 * | 5/1984 | Lion . |
| 4,449,680 | 5/1984 | Gratzer et al. . |
| 4,836,469 * | 6/1989 | Wagenfeld . |
| 6,102,328 * | 8/2000 | Kumata et al. . |

FOREIGN PATENT DOCUMENTS 0 432 972 B1   6/1993  (EP) .

* cited by examiner

Primary Examiner—Charles T. Jordan
Assistant Examiner—Tien Dinh
(74) Attorney, Agent, or Firm—Arent Fox Kintner Plotkin & Kahn

(57) ABSTRACT

It is an object of the present invention to reduce the wave resistance by disposing a fluid element such as an engine nacelle in a predetermined position on the upper surface of the main wing, and positively superposing the air flow generated by the fluid element onto the air flow on the upper surface of the main wing, thereby reducing the peak of the negative pressure on the upper surface of the main wing to retard the generation of a shock wave. If the engine nacelle is disposed on the upper surface of the main wing, and the longitudinal position of the front end of the engine nacelle is established in a range of 63% to 100% from the front end of a wing chord of the main wing (see b and i in FIG. 9), a shock wave is generated on the upper surface of the main wing in a range of transonic speed to inhibit an increase in wave resistance, whereby the cruising speed can be increased, while avoiding an increase in amount of fuel consumed. If the front end of the engine nacelle is in front of a position corresponding to 63% of the wing chord (see e and f in FIG. 9), a shock wave inhibiting effect is not exhibited, and the wave resistance is increased.

9 Claims, 17 Drawing Sheets

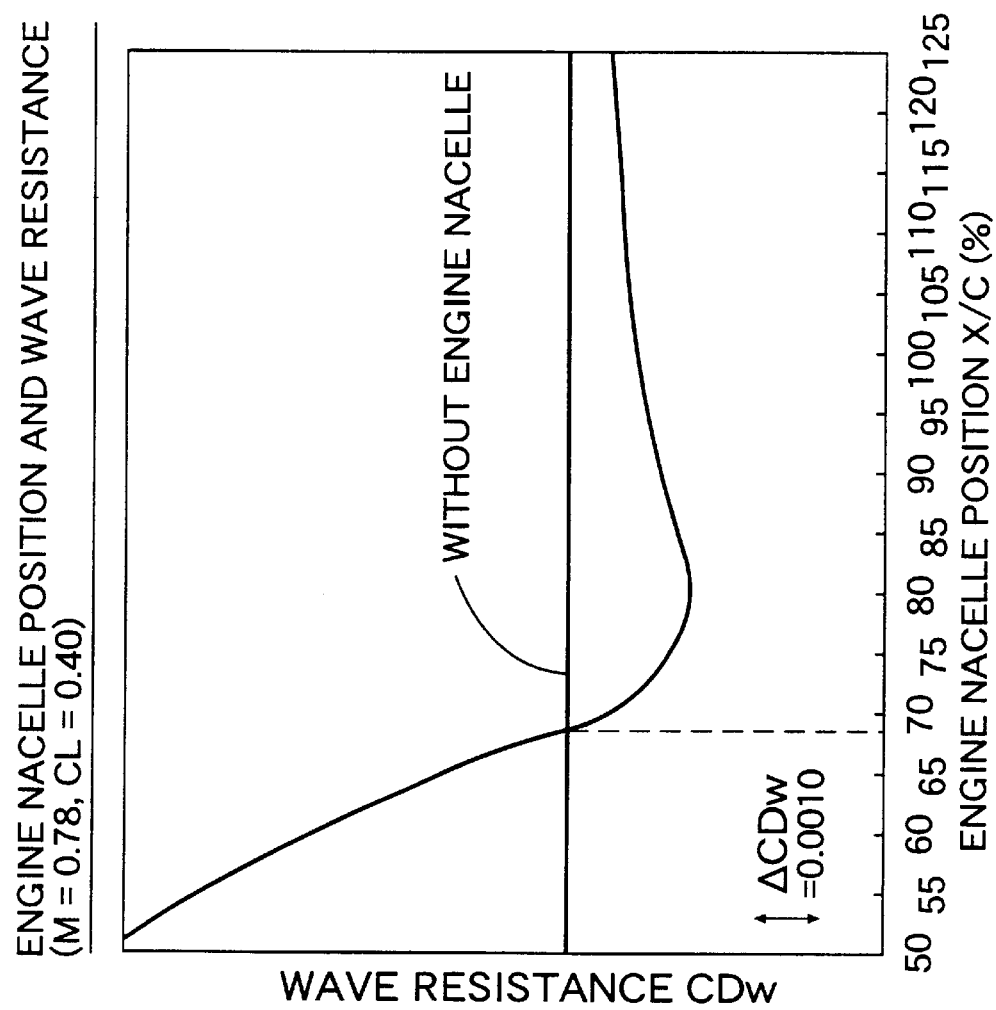

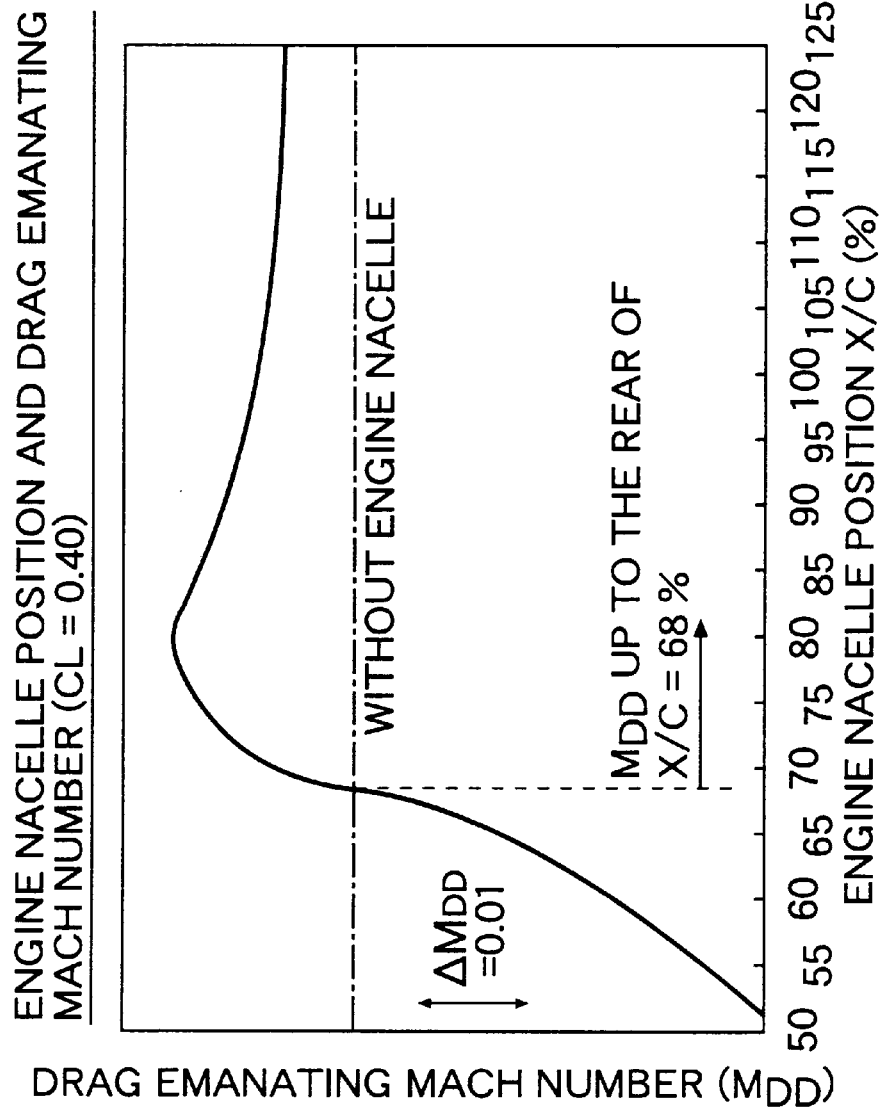

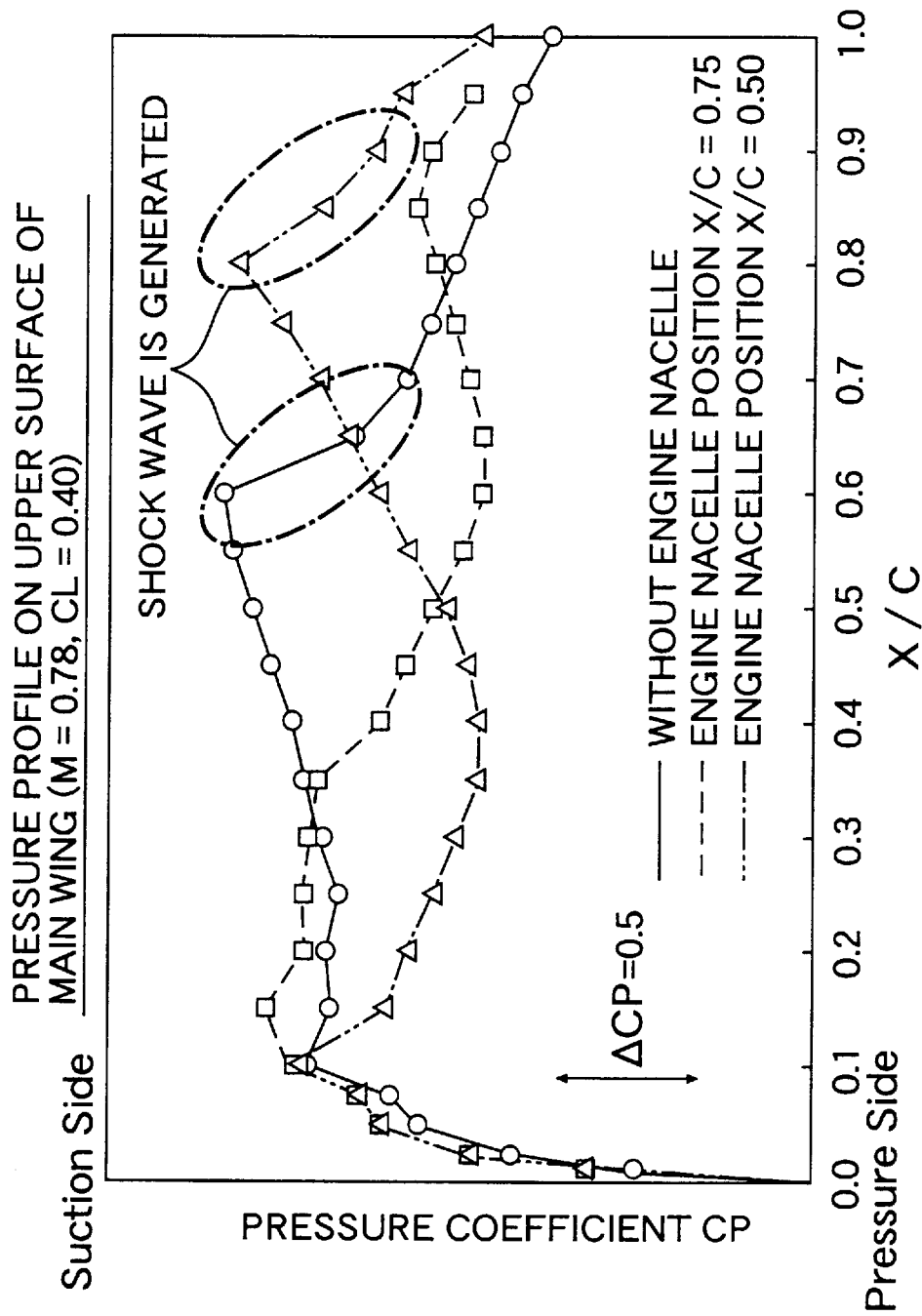

FIG.8

RELATIONSHIP BETWEEN M, $CD_{total} - CD_0$ (CL = 0.40) AND $M_{DD}$ IN EACH OF ENGINE NACELLE POSITIONS

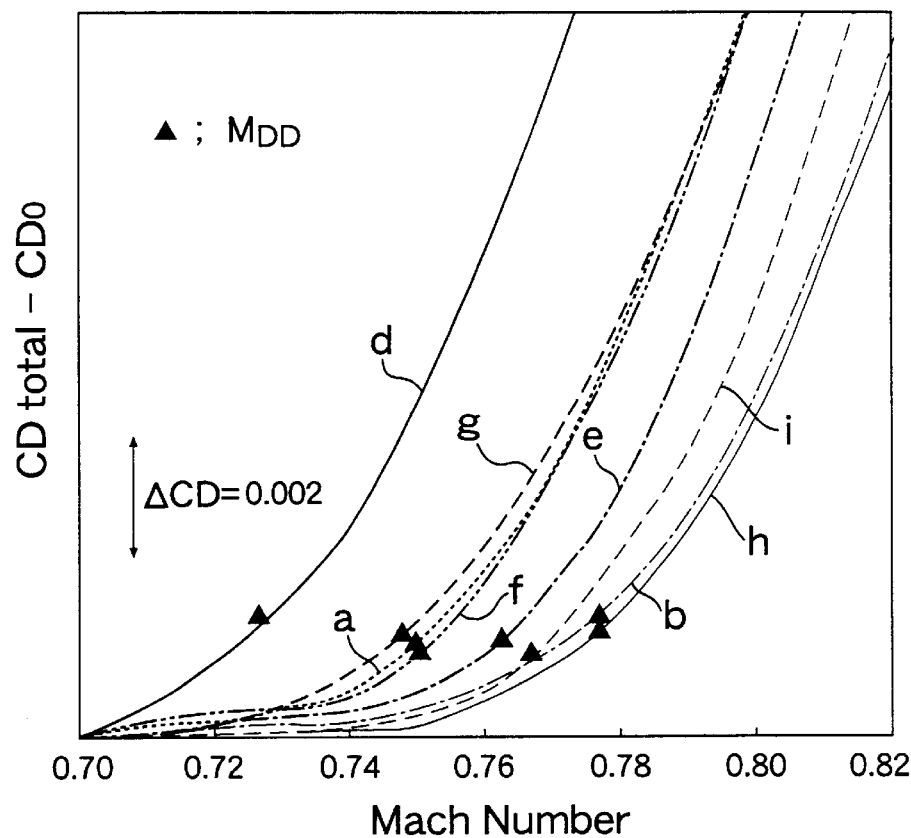

a ········· WITHOUT ENGINE NACELLE
b —··— X/C = 0.75 ON UPPER SURFACE OF MAIN WING
d ——— X/C = 0.5 ON UPPER SURFACE OF MAIN WING
e —·—·— X/C =-1.2 ON UPPER SURFACE OF MAIN WING
f ···—···— X/C =-1.2 ON LOWER SURFACE OF MAIN WING
g ---- X/C = 0.8 ON LOWER SURFACE OF MAIN WING
h ——— X/C = 0.75 DISPOSED AT REAR PORTION OF FUSELAGE
i ---- GENERAL DISPOSITION AT REAR PORTION OF FUSELAGE

PRESSURE PROFILE PROVIDED WITHOUT ENGINE NACELLE
(M = 0.75, CL = 0.40)

WITHOUT ENGINE NACELLE

DISPOSED ON UPPER SURFACE OF MAIN WING
(X/C=-1.2,0.5,0.75)

DISPOSED ON LOWER SURFACE OF MAIN WING
(X/C=-1.2,0.8)

DISPOSED AT REAR PORTION OF FUSELAGE
(X/C = 0.75, GENERAL DISPOSITION
AT REAR PORTION OF FUSELAGE)

METHOD FOR REDUCING WAVE RESISTANCE IN AIRPLANE

BACKGROUND OF THE INVENTION

1. Field of the Invention

The present invention relates to a method for reducing the wave resistance in an airplane by retarding the generation of a shock wave on an upper surface of a main wing of the airplane when the airplane is cruising at a transonic speed.

2. Description of the Related Art

Even if the flying speed of the airplane is equal to or lower than the sonic speed, a shock wave is, when the airplane speed being increased, generated at a certain speed of the airplane in a range of transonic speed locally exceeding sonic speed by the flow accelerated at a portion of an airframe (see FIG. 20). If the shock wave is generated in this manner on the upper surface of the main wing, a wave resistance is produced by the shock wave to cause the sudden increase in drag and the sudden decrease in lift force.

The phenomenon of a sudden increase in drag due to the generation of the shock wave is called a drag emanation, and the mach number of a main flow at that time, is called a drag emanating mach number $M_{DD}$. When the flying speed of the air plane reaches the drag emanating mach number $M_{DD}$, not only is the amount of fuel consumed increased due to the increase in drag, but also the balance of an airframe of the airplane is adversely influenced by the movement of the center of wind pressure. For this reason, it is necessary to retard the generation of the shock wave as much as possible to increase the drag emanating mach number $M_{DD}$.

To increase the drag emanating mach number $M_{DD}$, the following technique is conventionally employed:

(1) a wing profile is used which provides a high drag emanating mach number $M_{DD}$, (2) a sweep-back angle is provided in the main wing, and the like.

In an airplane including an engine nacelle for accommodating a gas turbine engine, consideration is taken in the mounting position for the engine nacelle in order to suppress the drag generated due to the aerodynamic interference of the main wing or fuselage with the engine nacelle to the minimum. The reduction of interference drag is generally provided by mounting engine nacelles to laterally opposite sides of a rear portion of the fuselage having a small interference with a main wing in a business jet plane, and by mounting engine nacelles through pylons to a lower surface of the main wing along which air flows at a lower speed as compared with air flow along an upper surface of the main wing in a large-sized passenger airplane.

In general, in the wing profile having a small thickness, the drag emanating mach number $M_{DD}$ is higher, but if the thickness is decreased, the volume of the main wing is decreased. For this reason, when a fuel tank is provided within the main wing, there is a problem that the amount of fuel carried therein is decreased, and moreover, there is a problem that a structure weight is increased, because a reduction in strength due to the decrease in thickness is compensated. Therefore, a peaky wing and a supercritical wing have been proposed as a wing profile which inhibits the generation of a shock wave, while ensuring a required thickness by improving the pressure profile on the main wing in the range of transonic speed.

If the sweep-back angle of the main wing is increased, the drag emanating mach number $M_{DD}$ can be increased, while ensuring the wing thickness to a certain extent, but the following problems are encountered: the stalling characteristic at a lower speed is degraded; the structure weight is increased for opposing a large flexure moment applied to the root of the main wing; and it is difficult to employ a wing of a laminar flow type having a smaller friction resistance, due to a flow in a span direction.

The known documents directed to the above problems include U.S. Pat. Nos. 4,311,289; 4,449,680; 4,314,681; 4,171,786 and 3,727,862.

U.S. Pat. No. 4,311,289 describes the prevention of the generation of a shock wave by providing a channel defined by a rear edge of a main wing, a fuselage, an engine nacelle and a pylon. The ratio of the sectional area of a channel outlet to the minimum sectional area of the channel is set at 1:1.065 or less.

U.S. Pat. No. 4,449,680 describes the reduction in effect of interference between an engine nacelle and a main wing by providing a critical counter area (a portion of the engine nacelle) and a non-critical counter area (the other portion of the engine nacelle and a pylon portion) from a critical zone of the main wing and a critical surface region of the engine nacelle, and forming the critical counter area into a shape which is along a streamline in the vicinity of such area and forming the non-critical counter area into a shape which is not along a streamline in the vicinity of such area.

U.S. Pat. No. 4,314,681 proposes the reduction of the generation of a shock wave by disposing a fairing having a characteristic curve from a thickness-wise intermediate portion to a rear edge of a pylon.

U.S. Pat. No. 4,171,786 proposes the avoidance of an increase in drag without use of a pylon by disposing an engine nacelle supported on a fuselage through an auxiliary wing above a main wing, and defining the height position of the engine nacelle with respect to an upper surface of the main wing and the longitudinal position of the engine nacelle with respect to a front edge of the main wing.

U.S. Pat. No. 3,727,862 proposes the prevention of the generation of resonance between an engine and a main wing by supporting the engine nacelle on the upper surface of the main wing with an elastomer interposed therebetween.

SUMMARY OF THE INVENTION

Accordingly, it is an object of the present invention to ensure that the generation of a shock wave is retarded to reduce the wave resistance by disposing a fluid element such as an engine nacelle at a predetermined position on the upper surface of the main wing, and positively superposing a decelerated region of the main flow generated by the fluid element onto an air flow on the upper surface of the main wing.

To achieve the above object, according to a first aspect and feature of the present invention, there is provided a method for reducing the wave resistance in an airplane, which comprises disposing a fluid element within the main flow above a rear portion of an air flow on an upper surface of a main wing, which generates a negative pressure on the upper surface of the main wing of the airplane cruising at a transonic speed, and superposing a decelerated region of the main flow generated ahead of the fluid element, onto the air flow on the upper surface of the main wing to decelerate the air flow on the upper surface of the main wing, thereby dropping the negative pressure on the upper surface of the main wing to inhibit the generation of a shock wave.

When the speed of the airplane reaches a drag emanating mach number, a shock wave is generated on the upper surface of the main wing to suddenly increase the wave resistance. If the fluid element is disposed within the main flow above the rear portion of the air flow on the upper surface of the main wing, the air flow on the upper surface of the main wing is decelerated due to the superposition of the decelerated region of the main flow generated in front of the fluid element, and hence, the negative pressure on the upper surface of the main wing can be dropped to inhibit the generation of the shock wave. Thus, the generation of the wave resistance in a range of transonic speed can be retarded to increase the drag emanating mach number, thereby increasing the cruising speed.

According to a second aspect and feature of the present invention, the negative pressure at the time when the air flow on the upper surface of the main wing becomes sonic speed, is defined as the critical pressure coefficient; a reference point at which the profile of pressure in the direction of a wing chord on the upper surface of the main wing is changed from a state equal to or larger than the critical pressure coefficient to a state smaller than the critical pressure coefficient, is established on the wing chord; and a front end of the fluid element is disposed to the rear of a position in front of the reference point by 5% of the length of the wing chord.

If the position of the front end of the fluid element is too far ahead, the initial generation of the shock wave is inhibited, and a new shock wave is generated at a rear portion of the wing chord of the main wing. Therefore, if the front end of the fluid element is disposed to the rear of a position 5% (of the length of the wing chord) ahead of a reference point at which the negative pressure on the upper surface of the main wing is changed from a state equal to or larger than the critical pressure coefficient to a state smaller than the critical pressure coefficient, i.e., a reference point at which the flow speed of the air flow on the upper surface of the main wing is changed from a state equal to or higher than the sonic speed to a state lower than the sonic speed, the decelerated region of the main flow generated by the fluid element can be effectively superposed onto the air flow on the upper surface of the main wing to reliably inhibit the generation of the shock wave.

According to a third aspect and feature of the present invention, the longitudinal distance between a front end of the fluid element and a front edge of the main wing is in a range of 68% to 100% of the length of a wing chord.

If the longitudinal distance between the front end of the fluid element and the front edge of the main wing is set in the range of 68% to 100% of the length of the wing chord, a shock wave inhibiting effect can be exhibited.

According to a fourth aspect and feature of the present invention, the longitudinal distance between the front end of the fluid element and the front edge of the main wing is in a range of 75% to 85% of the length of a wing chord.

If the longitudinal distance between the front end of the fluid element and the front edge of the main wing is set in the range of 75% to 85% of the length of the wing chord, a shock wave inhibiting effect can be further effectively exhibited.

According to a fifth aspect and feature of the present invention, the vertical distance between the lower surface of the fluid element and the upper surface of the main wing is decreased with an increase in longitudinal distance between the front end of the fluid element and the front edge of the main wing.

If the vertical distance between the lower surface of the fluid element and the upper surface of the main wing is decreased with the increase in longitudinal distance between the front end of the fluid element and the front edge of the main wing, a shock wave inhibiting effect can be maintained, even if the longitudinal distance of the fluid element is changed.

According to a sixth aspect and feature of the present invention, the fluid element is a generally cylindrical engine nacelle covering a gas turbine engine.

The generally cylindrical engine nacelle covering, the gas turbine engine is utilized as the fluid element to exhibit a shock wave inhibiting effect and hence, it is unnecessary to newly provide a special fluid element.

According to a seventh aspect and feature of the present invention, the negative pressure at the time when the air flow on the upper surface of the main wing becomes sonic speed, is defined as a critical pressure coefficient; a reference point at which the profile of pressure in a direction of the wing chord on the upper surface of the main wing is changed from a state equal to or larger than the critical pressure coefficient to a state smaller than the critical pressure coefficient, is established on the wing chord; and a front end of the engine nacelle is disposed between a position in front of the reference point by 5% of the length of the wing chord and a position to the rear of the reference point by a distance equal to the diameter of the lip front edge of the engine nacelle.

If the position of the front end of the engine nacelle is too far in front, the initial generation of the shock wave is inhibited, but a new shock wave is generated at a rear portion of the wing chord of the main wing. Therefore, if the front end of the engine nacelle is disposed to the rear of a position 5% (of the length of the wing chord) ahead of reference point at which the negative pressure on the upper surface of the main wing is changed to the value smaller than the critical pressure coefficient, i.e., a reference point at which the flow speed of the air flow on the upper surface of the main wing is changed from a state equal to or the higher than the sonic speed to a state lower than the sonic speed, the decelerated region of the main flow generated by the engine nacelle can be effectively superposed onto the air flow on the upper surface of the main wing to reliably inhibit the generation of a shock wave. On the other hand, if the front end of the engine nacelle is too much to the rear, the influence of the decelerated region of the main flow generated by the engine nacelle is diminished, resulting in a reduction in the effect of inhibiting the generation of the shock wave. Therefore, if the front end of the engine nacelle is disposed in front of the position to the rear of the reference point by the distance equal to the diameter of the lip front end of the engine nacelle, the decelerated region of the main flow generated by the engine nacelle can be effectively superposed onto the air flow on the upper surface of the main wing to reliably inhibit the generation of the shock wave.

According to an eighth aspect and feature of the present invention, the vertical distance between the upper surface of the main wing and the lower surface of the engine nacelle is in a range of 30% to 100% of the outside diameter of the engine nacelle.

If the vertical distance between the upper surface of the main wing and the lower surface of the engine nacelle is set in the range of 30% to 100% of the outside diameter of the engine nacelle, a shock wave inhibiting effect can be maintained, even if the longitudinal distance of the fluid element is changed.

According to a ninth aspect and feature of the present invention, the engine nacelle is supported by a pylon which is raised on the upper surface of the main wing.

If the engine nacelle is mounted on the upper surface of the main wing by the pylon, a wide cabin space in the fuselage can be ensured, as compared with the case where the engine nacelle is mounted on the fuselage. Moreover, the flexure moment applied to the root of the main wing by a lift force can be alleviated by the inertial weight of the engine to contribute to a reduction in weight of the structure.

The above and other objects, features and advantages of the invention will become apparent from the following description of the preferred embodiment taken in conjunction with the accompanying drawings.

BRIEF DESCRIPTION OF THE DRAWINGS

FIG. 5 is a graph showing the relationship between the engine nacelle position X/C and the wave resistance.

FIG. 6 is a graph showing the relationship between the engine nacelle position X/C and the drag emanating mach number $M_{DD}$.

FIG. 7 is a graph showing the coefficient CP of pressure on an upper surface of a main wing along a wing chord.

FIG. 8 is a graph showing the relationship between the mach number M and the drag coefficient resulting from subtraction of a shape drag coefficient $CD_0$ from a total drag coefficient $CD_{total}$ as well as the drag emanating mach number $M_{DD}$ in each of the engine nacelle positions.

DETAILED DESCRIPTION OF THE PREFERRED EMBODIMENT

The present invention will now be described by way of an embodiment with reference to the accompanying drawings.

Figure 1:
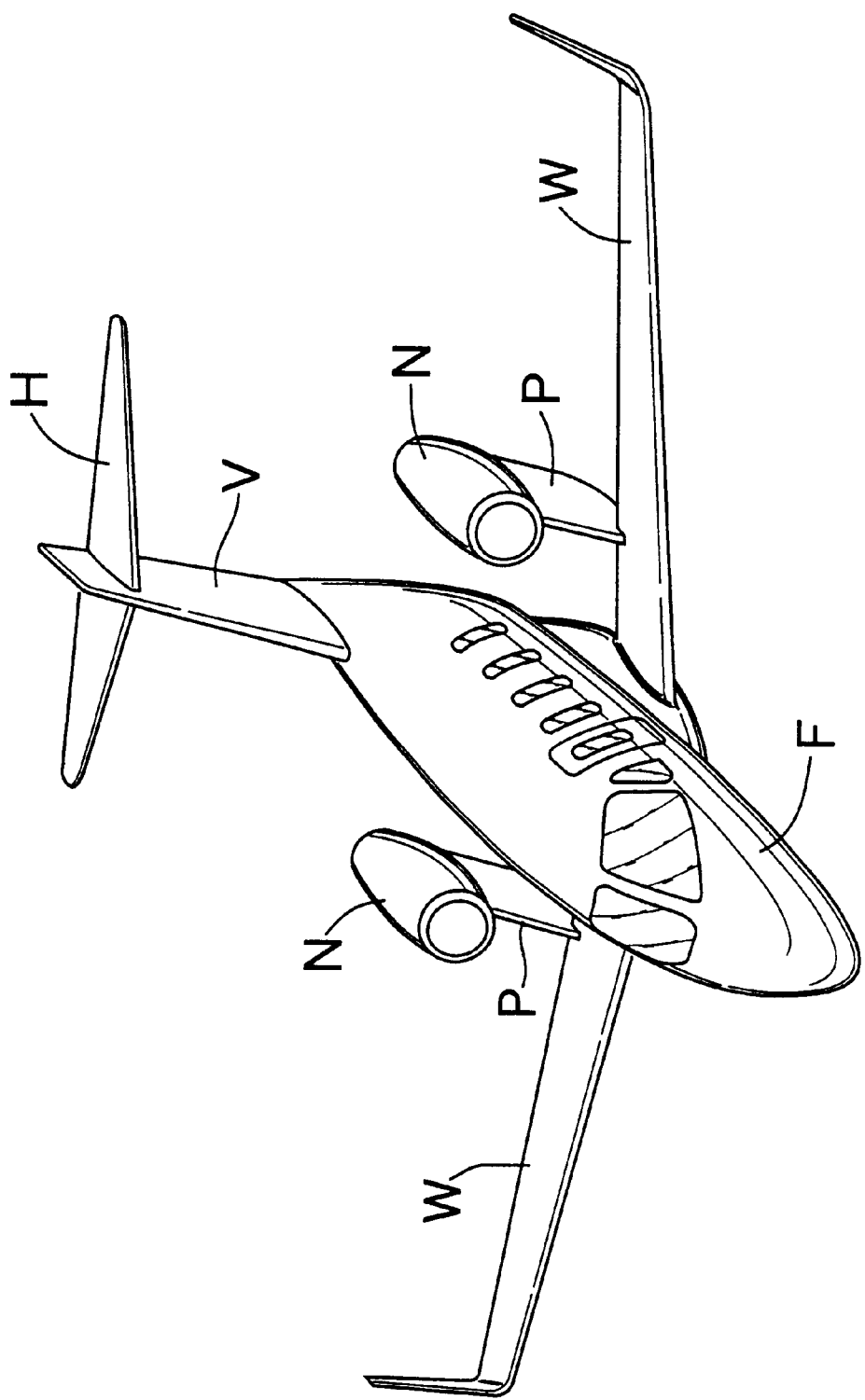
FIG. 1 is a perspective view of a twin-engine business jet-propelled airplane to which the present invention is applied.

As shown in FIG. 1, an airplane in this embodiment is a business jet-propelled airplane including two gas turbine engines, and includes a fuselage F, left and right main wings W, W mounted on a lower surface of a central portion of the fuselage F, a vertical tail wing V mounted on a rear portion of the fuselage F, and a horizontal tail wing H mounted at an upper end of the vertical tail wing V. Generally cylindrical engine nacelles N, N covering the two gas turbine engines are respectively supported at upper ends of a pair of pylons P, P above the upper surfaces of the left and right main wings W, W.

The present invention is intended to inhibit the generation a shock wave on the upper surface of the main wing W by positively utilizing the interference of air flow on the upper surface of the main wing W with air flow in the vicinity of the engine nacelle N. Therefore, the position of engine nacelle N mounted relative to an airframe, is an important factor.

Figure 2:
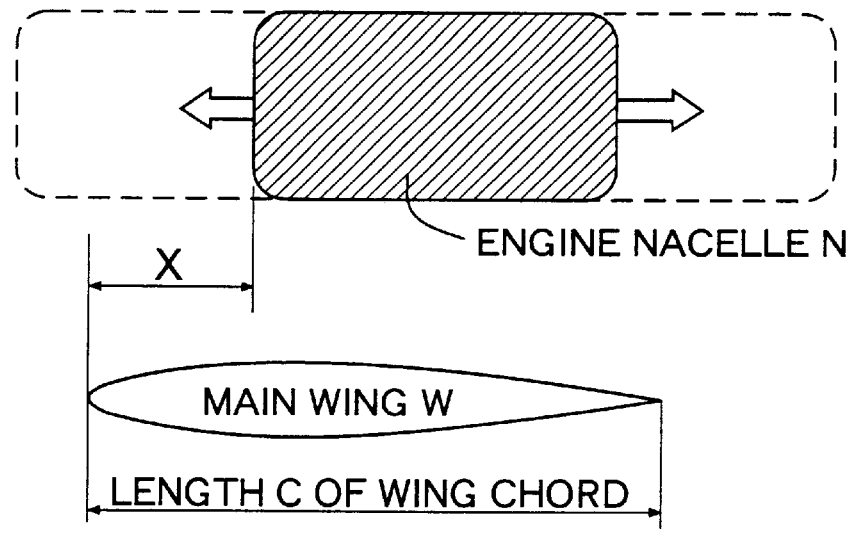
FIG. 2 is a diagram for explaining the parameter defining the longitudinal position of an engine nacelle.

As shown in FIG. 2, the longitudinal mounting position of the engine nacelle N is based on a front edge of a main-wing chord below the engine nacelle N, and is defined as X/C (%) by a longitudinal distance X from the front edge of the wing chord to a front end (lip) of the engine nacelle N, and a length C of the wing chord. Therefore, when the front end of the engine nacelle N is located above the front edge of the main wing W, X/C is equal to 0%. When the front end of the engine nacelle N is located above a rear edge of the main wing W, X/C is equal to 100%.

Figure 3:
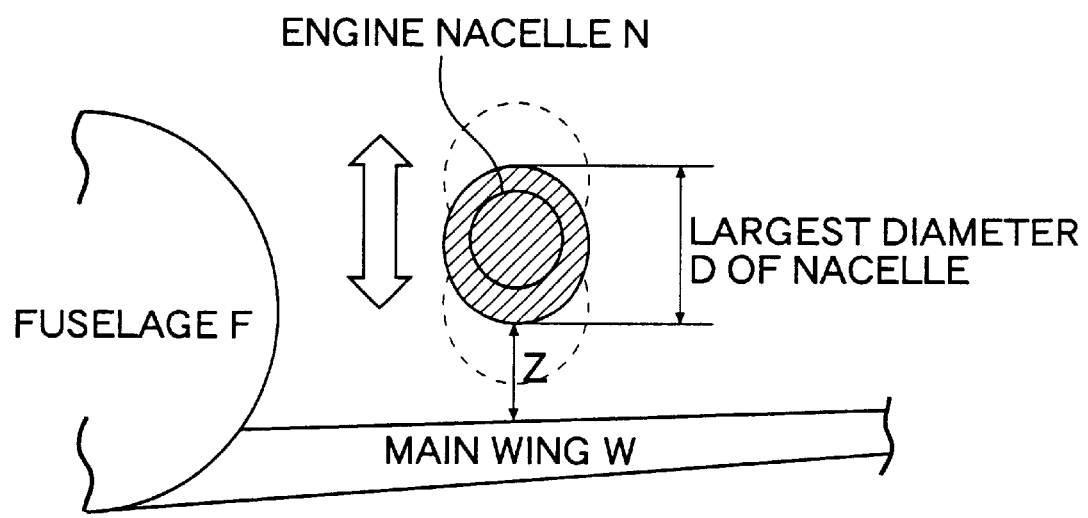
FIG. 3 is a diagram for explaining the parameter defining the vertical position of the engine nacelle.

As shown in FIG. 3, the vertical mounting position of the engine nacelle N is based on the uppermost surface of the main wing W below the engine nacelle N, and is defined as Z/D (%) by a vertical distance Z from the uppermost surface of the main wing W to the lowermost surface of the engine nacelle N, and the largest diameter D of the engine nacelle N. The vertical distance Z corresponds to a vertical spacing between the uppermost surface of the main wing W and the lowermost surface of the engine nacelle N in FIG. 3 which is a front view of the airframe.

Figure 4:
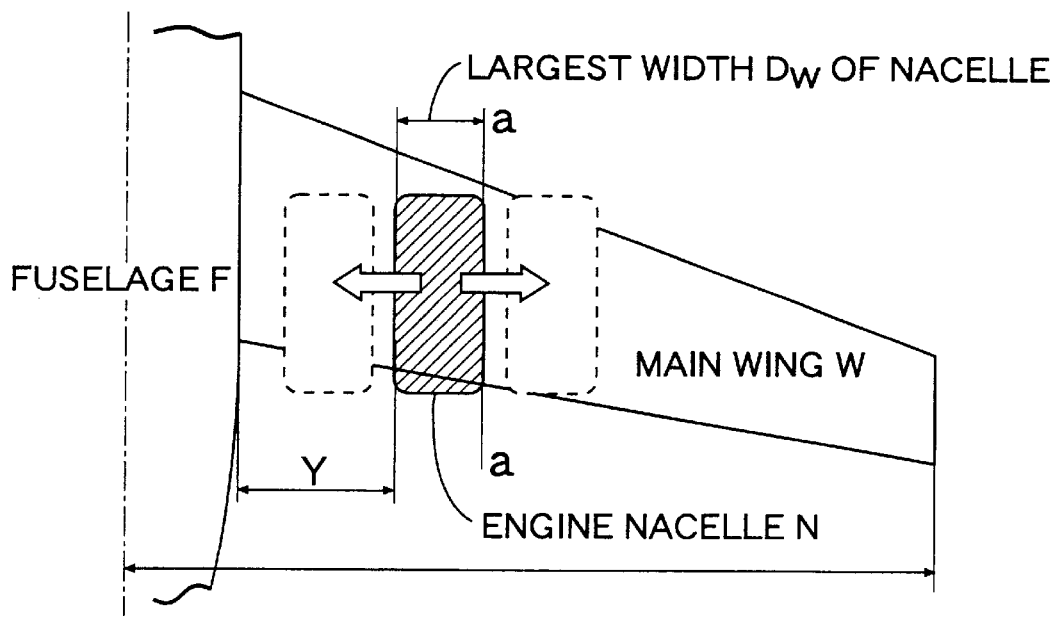
FIG. 4 is a diagram for explaining the parameter defining the position of the engine nacelle in a span direction.

As shown in FIG. 4, the position of mounting the engine nacelle N in the span direction is based on an outer end of the fuselage F in the span direction and defined as Y/Dw (%) by a distance Y in the span direction from the outer end of the fuselage F in the span direction to an inner end of the engine nacelle N in the span direction, and the largest width Dw of the engine nacelle N.

Among the parameter (X/C) defining the longitudinal position of the engine nacelle N, the parameter Z/D defining the vertical position of the engine nacelle N and the parameter Y/Dw defining the span-wise position of the engine nacelle N, the parameter dominant for inhibiting the generation of a shock wave is X/C. The parameter Z/D defining the vertical position of the engine nacelle N has a smaller degree of influence, as compared with the parameter X/C, and the parameter Y/Dw defining the span-wise position of the engine nacelle N has an even smaller degree of influence.

With the forgoing in view, in the present embodiment, the parameter X/C defining the longitudinal position of the engine nacelle N was selected as the main parameter; and a wind tunnel test and analysis were carried out with the parameter Z/D set as a fixed value (Z/D=0.5) and the parameter Y/Dw set as a fixed value (Y/Dw=0.73). Here, Z/D=0.5 is the vertical position of the engine nacelle N, in which a shock wave inhibiting effect is obtained effectively, and Y/Dw=0.73 is the span-wise position of the engine nacelle N, in which the influence of the interference of coupled portions of the fuselage F and the main wing W can be avoided effectively.

FIG. 5 is a graph showing the relationship between the engine nacelle position X/C and the wave resistance, wherein the mach number of a main flow is set at M=0.78 corresponding to the mach number in which a shock wave is generated on the upper surface of the main wing W, and the lift coefficient is set at CL=0.40 corresponding to the cruising speed of the airplane. If the engine nacelle position X/C is disposed to the rear of the 68% position on the wing chord, the wave resistance is decreased to the extent of 40% of the maximum value from a wave resistance provided without provision of the engine nacelle.

If the engine nacelle position X/C is disposed in front of the 68% position on the wing chord, the wave resistance is suddenly increased from the wave resistance provided without provision of the engine nacelle.

FIG. 6 is a graph showing the relationship between the engine nacelle position X/C and the drag emanating mach number $M_{DD}$, wherein the lift coefficient CL=0.40. If the engine nacelle position X/C is disposed to the rear of a 68% position on the wing chord, the drag emanating mach number $M_{DD}$ is increased from a drag emanating mach number $M_{DD}$ provided without provision of the engine nacelle, and reaches the maximum value $M_{DD}$ in an optimal position, i.e., the engine nacelle position X/C=80%. On the other hand, if the engine nacelle position X/C is disposed in front of the 68% position on the wing chord, the drag emanating mach number $M_{DD}$ is suddenly decreased from the drag emanating mach number $M_{DD}$ provided without provision of the nacelle.

FIG. 7 is a graph showing the coefficient CP of pressure on the upper surface of the main wing corresponding to the wing chord extending along a line a—a in FIG. 4, wherein the solid line corresponds to the case where the engine nacelle is not provided; the dashed line corresponds to the case where the engine nacelle position X/C is equal to 75%; and the two-dot dashed line corresponds to the case where the engine nacelle position X/C is equal to 50%. In all of the cases, the mach number M of the main flow is equal to 0.78, and the lift coefficient CL is equal to 0.40. When the engine nacelle is not provided, a shock wave is generated due to an intensive pressure gradient near the 60% position on the wing chord, but when the engine nacelle position X/C is 75%, the negative pressure near the 60% position on the wing chord is dropped, whereby the intensive pressure gradient is moderated to inhibit the generation of the shock wave.

Namely, in the case of the engine nacelle position X/C equal to 75%, the pressure profile is a concave profile having two negative pressure peaks near the 15% position and near the 85% position on the wing chord. Particularly, the pressure coefficient is remarkably dropped near the 60% position on the chord, in which there is the negative pressure peak when the engine nacelle is not provided. Thus, the generation of the shock wave and the increase in wave resistance are prevented.

In the case of the engine nacelle position X/C equal to 50%, the pressure coefficient near the 40% position on the wing chord is remarkably dropped, and the pressure profile is a concave profile having two negative pressure peaks near the 10% position and near the 80% position on the wing chord. However, a shock wave is generated near the 80% position on the wing chord due to the presence of the negative pressure peak and the intensive pressure gradient succeeding thereto.

In the above way, if the engine nacelle position (X/C) is established to the rear of the 68% position on the wing chord, the drag emanating mach number $M_{DD}$ is increased, as compared with the case where the engine nacelle is not provided, whereby it is difficult for the shock wave to be generated. However, if the engine nacelle position (X/C) is established in front of the 68% position on the wing chord, the shock wave is generated, causing the drag emanating mach number $M_{DD}$ to be decreased.

Figure 16:
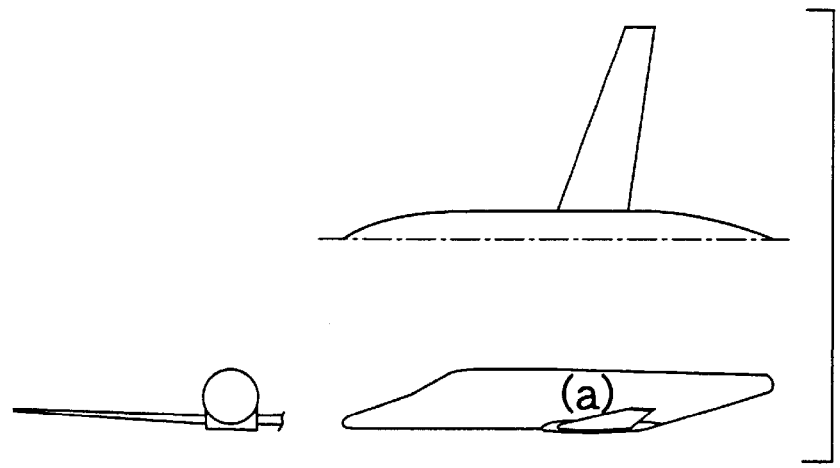
FIG. 16 shows the shape of an airframe having no engine nacelle.
Figure 17:
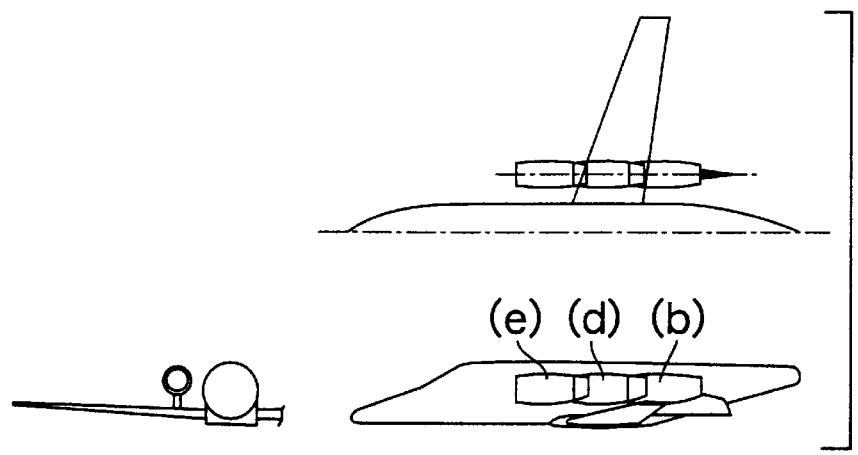
FIG. 17 shows the shape of an airframe having an engine nacelle disposed on the upper surface of the main wing.
Figure 18:
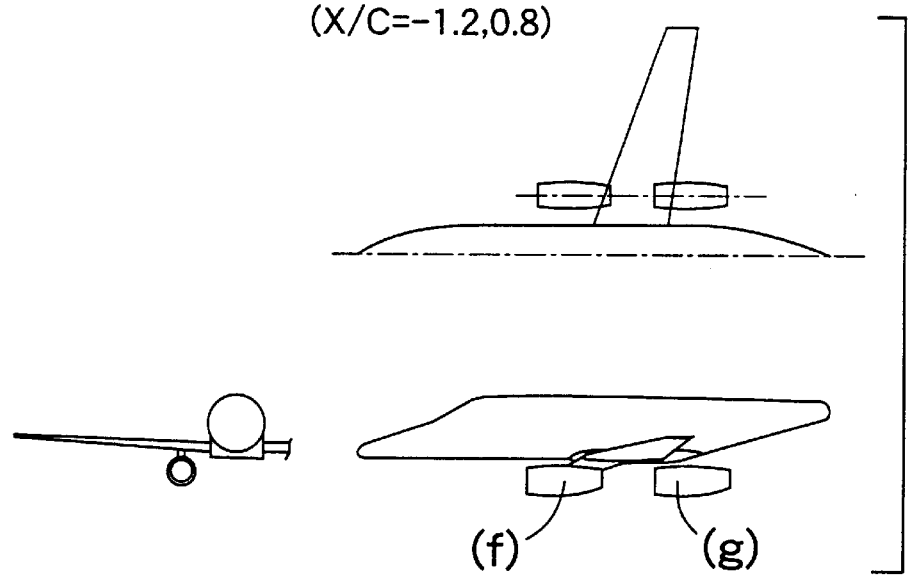
FIG. 18 shows the shape of an airframe having an engine nacelle disposed on a lower surface of the main wing.
Figure 19:
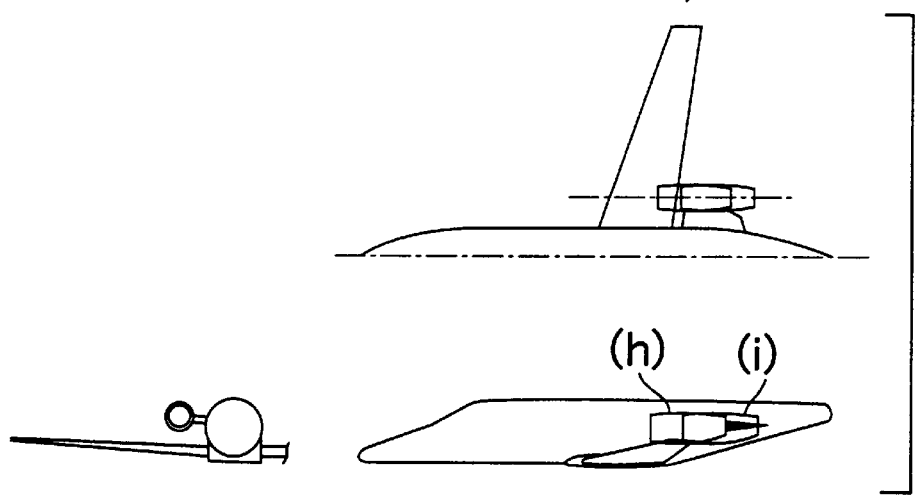
FIG. 19 shows the shape of an airframe having an engine nacelle disposed at a rear portion of a fuselage.
Figure 20:
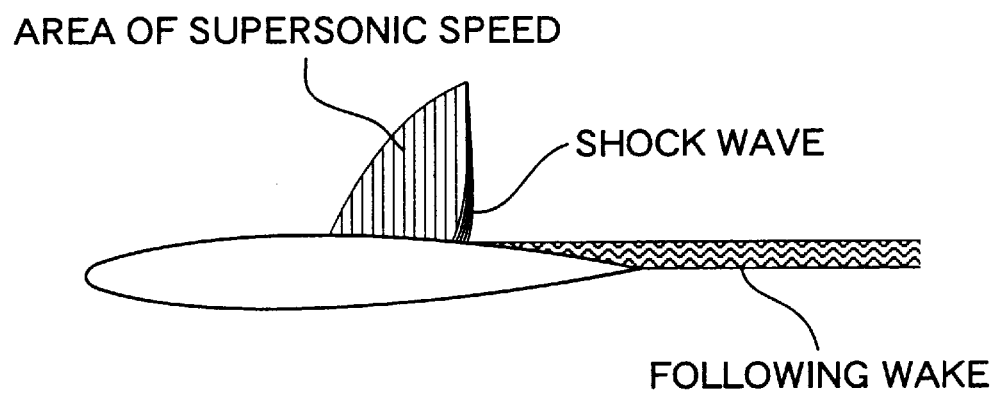
FIG. 20 is a diagram for explaining a shock wave and a wave resistance.

FIG. 8 is a graph showing the relationship between the mach number M and the drag coefficient resulting from subtraction of a shape drag coefficient $CD_0$ from a total drag coefficient $CD_{total}$ as well as the drag emanating mach number $M_{DD}$ in each of the engine nacelle positions. In all of the cases, the lift coefficient CL is equal to 0.40. A line corresponds to a reference case where the engine nacelle is not provided (see FIG. 16); lines b, d and e correspond to cases where the engine nacelle is provided on the upper surface of the main wing (see FIG. 17); lines f and g correspond to cases where the engine nacelle is provided on the lower surface of the main wing (see FIG. 18); and lines h and i correspond to cases where the engine nacelle is provided at a rear portion of the fuselage (see FIG. 19). ▲ plotted on each of the lines indicates the drag emanating mach number $M_{DD}$ for every engine nacelle position.

When the engine nacelle is disposed on the upper surface of the main wing, the case of the engine nacelle position X/C equal to 75% (line b) is excellent, and in the entire range of mach number, the drag coefficient ($CD_{total}-CD_0$) is lower than the line a (when the engine nacelle is not provided).

In the case of the engine nacelle position X/C equal to 50% (the line d), the drag coefficient ($CD_{total} -CD_0$) is highest, and it is presumed that an intensive shock wave has been generated. In the case of the engine nacelle position X/C equal to −120% (the line e), the drag coefficient ($CD_{total} -CD_0$) is lower than in the case of engine nacelle position X/C equal to 50%, and the effect of inhibiting the generation of the shock wave is observed for the present.

When the engine nacelle is disposed on the lower surface of the main wing, the effect of inhibiting the generation of the shock wave is not observed in the case of the engine nacelle position X/C equal to −120% (the line f) nor in the case of the engine nacelle position X/C equal to 80% (the line g). However, in the case indicated by the line f where the engine nacelle is disposed at a front lower portion of the main wing (this disposition is widely employed in a large-sized passenger airplane), it is observed that the drag coefficient ($CD_{total}-CD_0$) is slightly lower than that in the case indicated by the line g where the engine nacelle is disposed at the rear lower portion of the main wing.

When the engine nacelle is disposed at the rear portion of the fuselage, the case of the engine nacelle position X/C equal to 75% (the line h) exhibits an excellent characteristic equivalent to that in the case where the engine nacelle is disposed in the position X/C=75% on the upper surface of the main wing (the line b). This indicates that if the engine nacelle position X/C is equal to 75%, the equivalent shock wave inhibiting effect is obtained even if the engine nacelle is mounted on the main wing and on the fuselage. In the general disposition (X/C>100%) of the engine nacelle at the rear portion of the fuselage indicated by the line i, the effect of inhibiting the generation of the shock wave is remarkably decreased.

Figure 9:
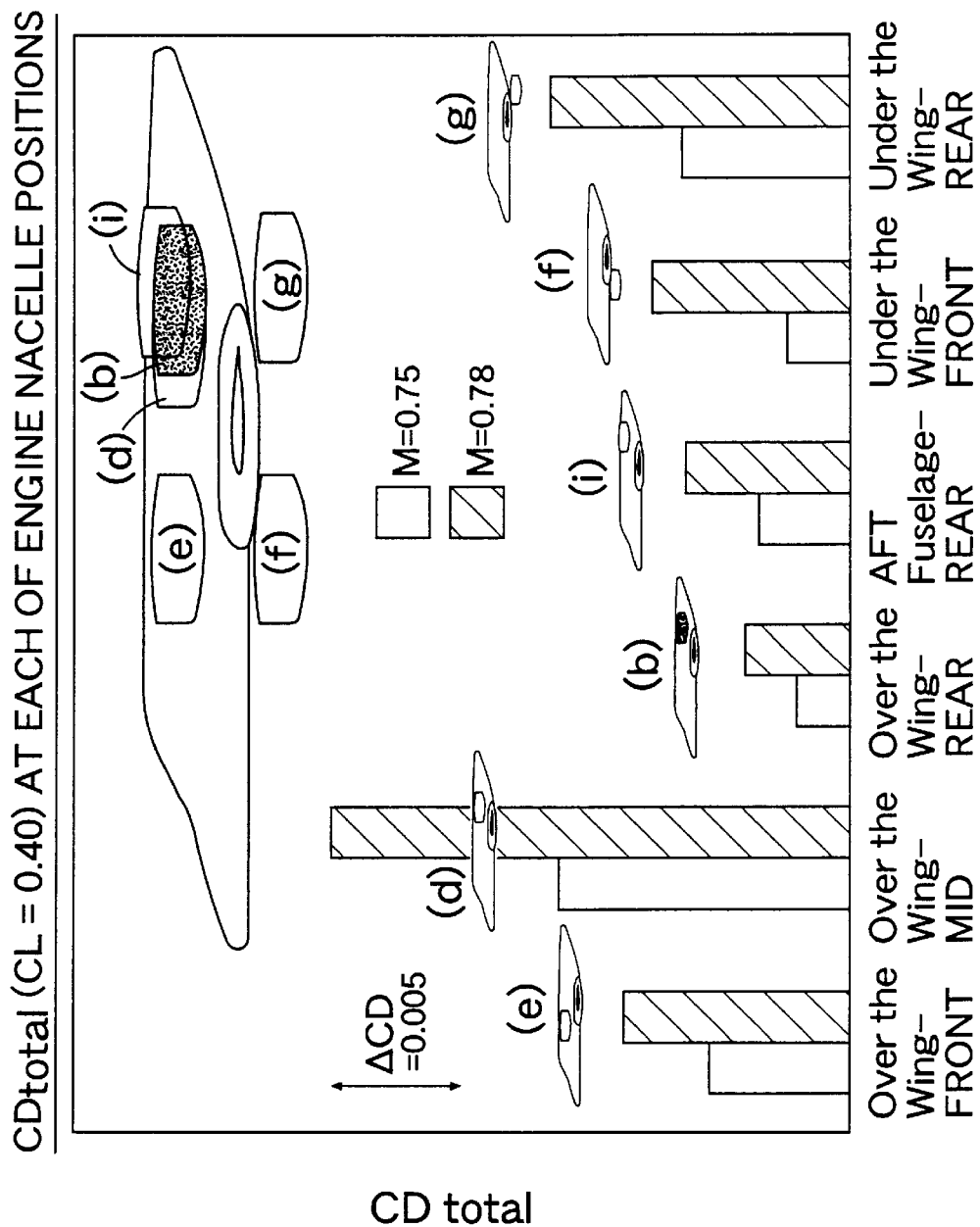
FIG. 9 is a graph showing the total drag coefficient $CD_{total}$ in each of the engine nacelle positions and two mach numbers.

FIG. 9 is a graph showing the total drag coefficient $CD_{total}$ in each of the engine nacelle positions with respect to two types of mach numbers (M=0.75 and M=0.78). In all of the cases, the lift coefficient CL is equal to 0.40. Data in FIG. 9 corresponds to that in FIG. 8, and b, d, e, f, g, and i in FIG.

9 are the same as b, d, e, f, g, and i in FIG. 8. It is confirmed even from FIG. 9 that the total drag coefficient $CD_{total}$, is smallest in the case where the engine nacelle is disposed in the position X/C=75% on the upper surface of the main wing (see b).

By disposing the engine nacelle in an appropriate position on the upper surface of the main wing, as described above, the drag emanating mach number $M_{DD}$, in which the shock wave is generated on the upper surface of the main wing to suddenly increase the wave resistance, can be varied in an increasing direction, thereby increasing the cruising speed, while suppressing the amount of fuel consumed to a lower level. In this embodiment, when the engine nacelle position is in a range lying in rear of X/C=63%, the shock wave inhibiting effect is obtained, and the optimal position is near X/C=80%. The preferable range of the engine nacelle position is X/C=68% to 100% or X/C=63% to 95%, and the particularly preferable range is X/C=75% to 85%.

Appropriate values of the vertical position Z/D and the span-wise position Y/Dw of the engine nacelle and the effect thereof will be considered below. The optimal vertical position with respect to the longitudinal position X/C=75% of the engine nacelle is Z/D=50%. However, if the vertical position Z/D is too small, a flow speed between the lower surface of the engine nacelle and the upper surface of the main wing is higher, and a shock wave is generated as in the case where the engine nacelle is disposed in the longitudinal position X/C=0.5, and as a result, the wave resistance is increased. On the other hand, if the vertical position Z/D is too large, the influence exerted to an air flow along the upper surface of the main wing by the engine nacelle is reduced and hence, the effect is close to that in the case where the engine nacelle is not provided. In addition, from the viewpoint of an aspect of steering stability, the following disadvantage arises: the position of a thrust line is higher, and thus, the head-lowering moment is increased.

When the longitudinal position X/C of the engine nacelle is to be longitudinally moved in a range effective for inhibiting the shock wave, it is required that the vertical position Z/D be moved more upwards, as the longitudinal position X/C is moved more forwards, and the vertical position Z/D be moved more downwards, as the longitudinal position X/C is moved more rearwards. The range of the vertical position Z/D of the engine nacelle effective for inhibiting the shock wave is in the order of 0.3 to 1.0.

The optimal span-wise position Y/Dw of the engine nacelle with respect to the longitudinal position X/C=75% of the engine nacelle, is equal to 0.73. The range in which the engine nacelle exhibits the shock wave inhibiting effect has an effect of some degree on the side of the fuselage and on the side of the wing end about a pylon. The coupled portions of the fuselage and the main wing are originally largely interfering portions and hence, a fairing measure or a measure to improve the wing profile of the wing root is generally taken, but the interference of the coupled portions of the fuselage and the main wing can be alleviated even with this disposition of the engine nacelle.

If the span-wise position Y/Dw of the engine nacelle is established too near the wing end, the shock wave inhibiting effect at the wing end is increased, and on the other hand, it is impossible to contribute to the alleviation of the interference of the coupled portions of the fuselage and the main wing. Conversely, if the span-wise position Y/Dw of the engine nacelle is established too near the fuselage, the shock wave inhibiting effect at the wing end may be decreased, but also the interference resistance of the coupled portions of the fuselage and the main wing may be increased in some cases. Therefore, the above-described span-wise position Y/Dw= 0.73 is an optimal span-wise position for the engine nacelle.

Figure 10:
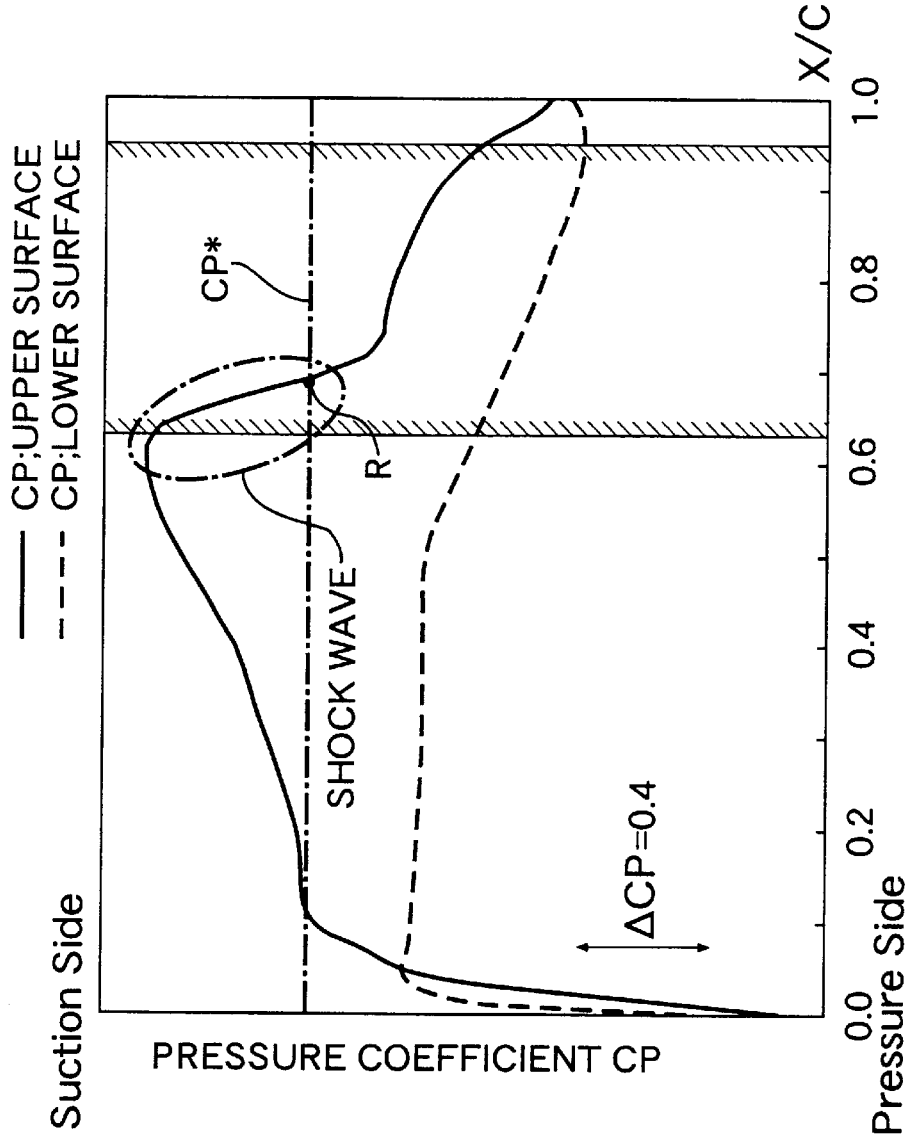
FIG. 10 is a graph showing the pressure profile provided along the wing chord without the engine nacelle.

FIG. 10 shows a pressure profile along the wing chord when the engine nacelle is not provided; the mach number M is equal to 0.75; and the lift coefficient CL is equal to 0.40, wherein a shock wave is observed at near X/C=70%. The critical pressure coefficient CP* shown by a one-dot dashed line is a pressure coefficient CP at the time when the flow speed on the upper surface of the main wing becomes the sonic speed (M=1), and it can be seen that the flow speed exceeds the sonic speed in a range of X/C=12% to 68% on the upper surface of the main wing. The line (solid line) of the pressure coefficient CP on the upper surface of the main wing crosses the line (one-dot dashed line) of the critical pressure coefficient CP* from a higher side to a lower side (from above to below in FIG. 10), and the intersection is determined as a reference point R (in this case, X/C=68%).

As already described with reference to FIG. 6, the position of X/C=68% is a position in which the drag emanating mach number $M_{DD}$ can be increased when the front end of the engine nacelle is disposed to the rear of such position. Therefore, to determine the appropriate longitudinal position for the engine nacelle, the profile of pressure on the upper surface of the main wing is first determined in a state in which the engine nacelle is not provided, and then, the reference point R which is the intersection of the line of the pressure profile and the line of the critical pressure coefficient CP* is determined. The front end (lip) of the engine nacelle is disposed to the rear of the reference point R. Thus, it is possible to increase the drag emanating mach number $M_{DD}$.

The position (X/C=68%) of the reference point R is not a universal threshold value for increasing the drag emanating mach number $M_{DD}$, and in general, if the front end of the engine nacelle is disposed to the rear of the position of X/C=63% laying 5% ahead of the reference point R, the drag emanating mach number $M_{DD}$ can be increased. However, when the front end of the engine nacelle is disposed to the rear of the reference point R (x/C=68%), the drag emanating mach number $M_{DD}$ can be reliably increased to provide a further large effect.

If the front end of the engine nacelle is too far to the rear from the reference point R, a decelerated region of a main flow generated by the engine nacelle cannot be superposed on the air flow on the upper surface of the main wing, and the effect of inhibiting the generation of the shock wave is decreased. When the diameter of the lip front edge of the engine nacelle is represented by $D_{LIP}$, if the position lying to the rear by the diameter $D_{LIP}$ of the lip front edge from the reference point R, is established and the front end of the engine nacelle is disposed in front of such position, the drag emanating mach number $M_{DD}$ can be increased to inhibit the generation of the shock wave. In the embodiment, the diameter $D_{LIP}$ of the lip front edge is 27% of the length C of the wing chord and therefore, the front end of the engine nacelle may be disposed in front of the position of X/C= 95%.

Figure 11:
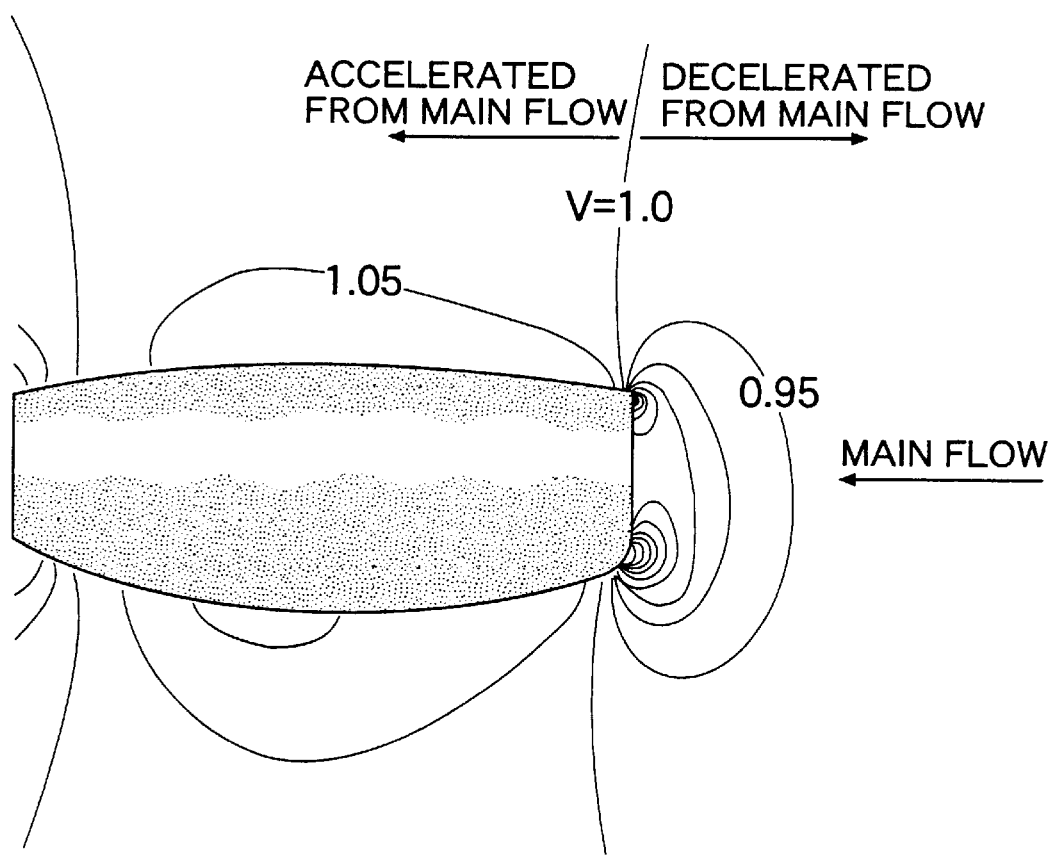
FIG. 11 is a diagram showing the speed profile around the engine nacelle.
Figure 12:
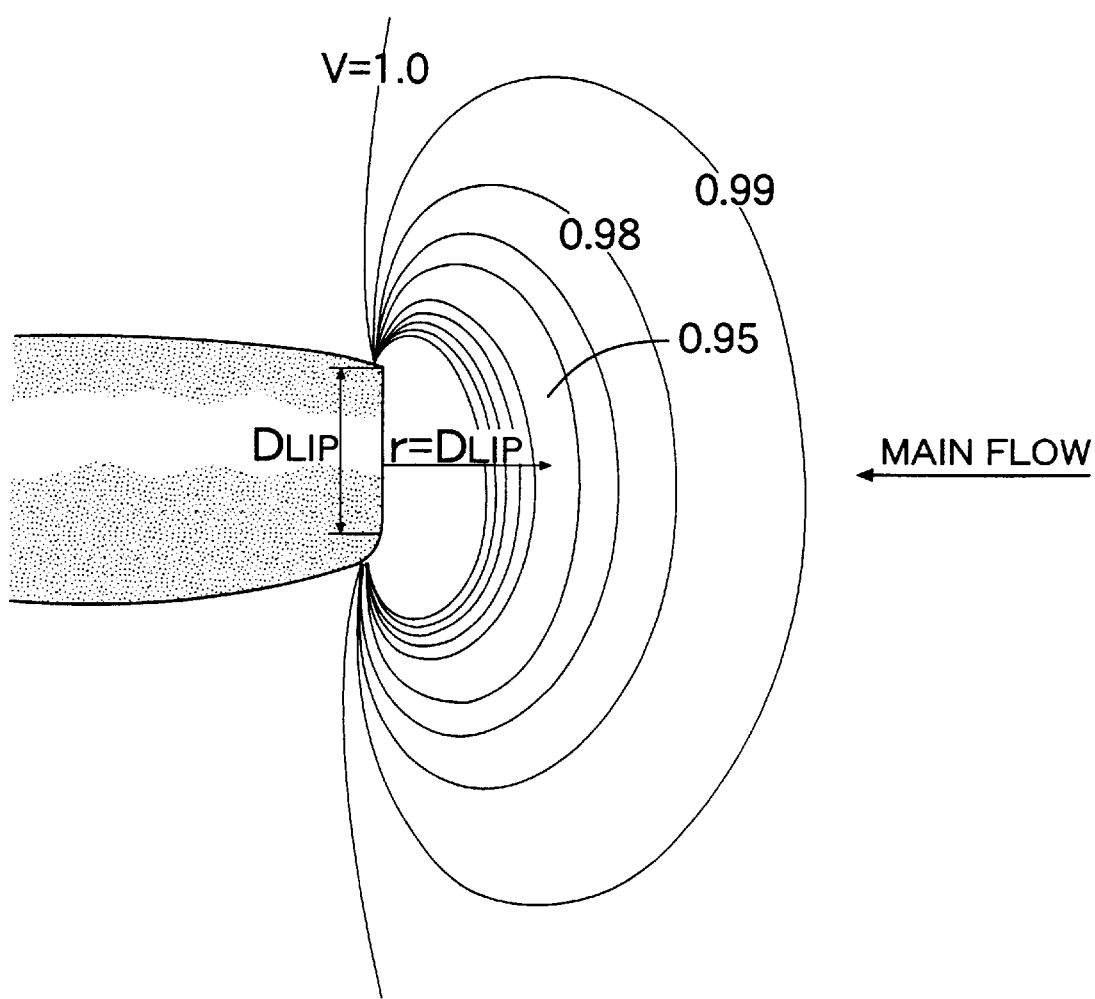
FIG. 12 is a diagram showing the speed profile in the vicinity of a tip end of the engine nacelle.

FIGS. 11 and 12 show speed profiles around the engine nacelle in a state in which there is no suction and no exhaust in the engine and the air flow passes through the engine nacelle (i.e., a flow-through state), wherein the mach number M of the main flow is equal to 0.75. The value of V in FIG. 11 represents a ratio of the flow speed around the engine nacelle to the flow speed of the main flow. It can be seen that the flow speed in front of the front end of the engine nacelle is decreased more than the main flow, and the flow speed to the rear of the front end of the engine nacelle is increased more than the main flow. Here, the suction is not taken into consideration, but it is common that the suction speed of the engine is slower than the flow speed of the main flow in the range of transonic speed, and if the suction of the engine is taken into consideration, the decelerated region in front of the engine nacelle tends to widen.

FIG. 12 shows a speed profile in the vicinity of the front end of the engine nacelle in an enlarged scale. If the diameter of a lip front edge of the engine nacelle is represented by $D_{LIP}$, the flow speed of the main flow is decreased by 5% or more in a substantially semi-circular area having a radius of $D_{LIP}$, in front of the engine nacelle. The flow speed in rear of the lip front edge of the engine nacelle is increased more than the flow speed of the main flow.

Figure 13:
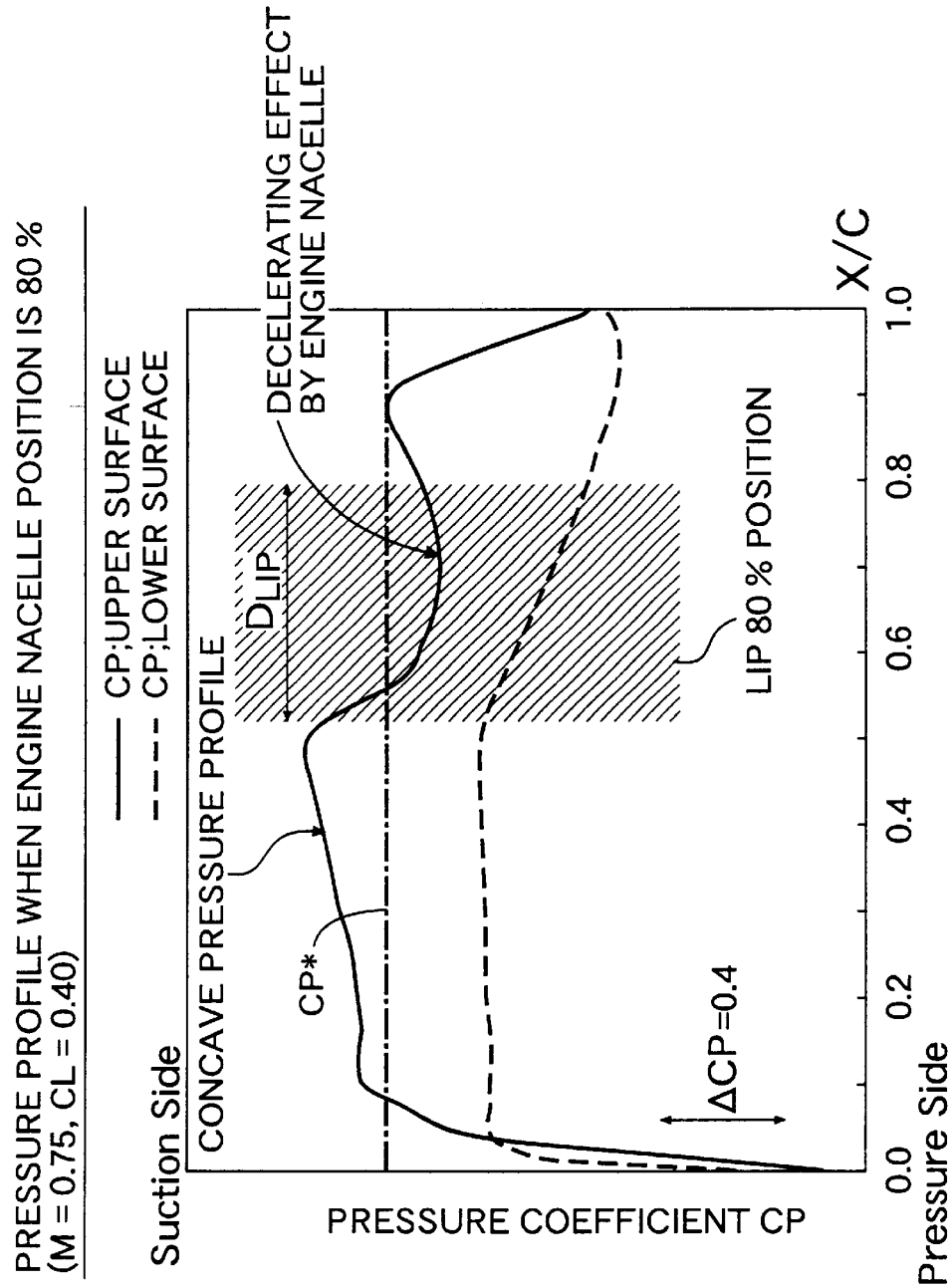
FIG. 13 is a graph showing the pressure profile provided along the wing chord when the engine nacelle position X/C is equal to 80%.

FIG. 13 shows a pressure profile provided when the front end of the engine nacelle is disposed in the position X/C=80% on the upper surface of the main wing in a state in which the mach number M is equal to 0.75 and the lift coefficient CL is equal to 0.40. As is apparent by comparison with the pressure profile (see FIG. 10) provided without provision of the engine nacelle under the same conditions, it can be seen that the negative pressure peak is remarkably dropped in the decelerated region in front of the engine nacelle (an obliquely lined area) in FIG. 13, and as a result, the pressure gradient is gentle or smoother, as compared with that in FIG. 10, whereby the generation of the shock wave is inhibited. It can be seen that in the pressure profile shown by the dashed line in FIG. 7 (in the case where the engine nacelle position X/C=75%), the pressure gradient is gentle as in FIG. 13, whereby the generation of the shock wave is inhibited.

Figure 14:
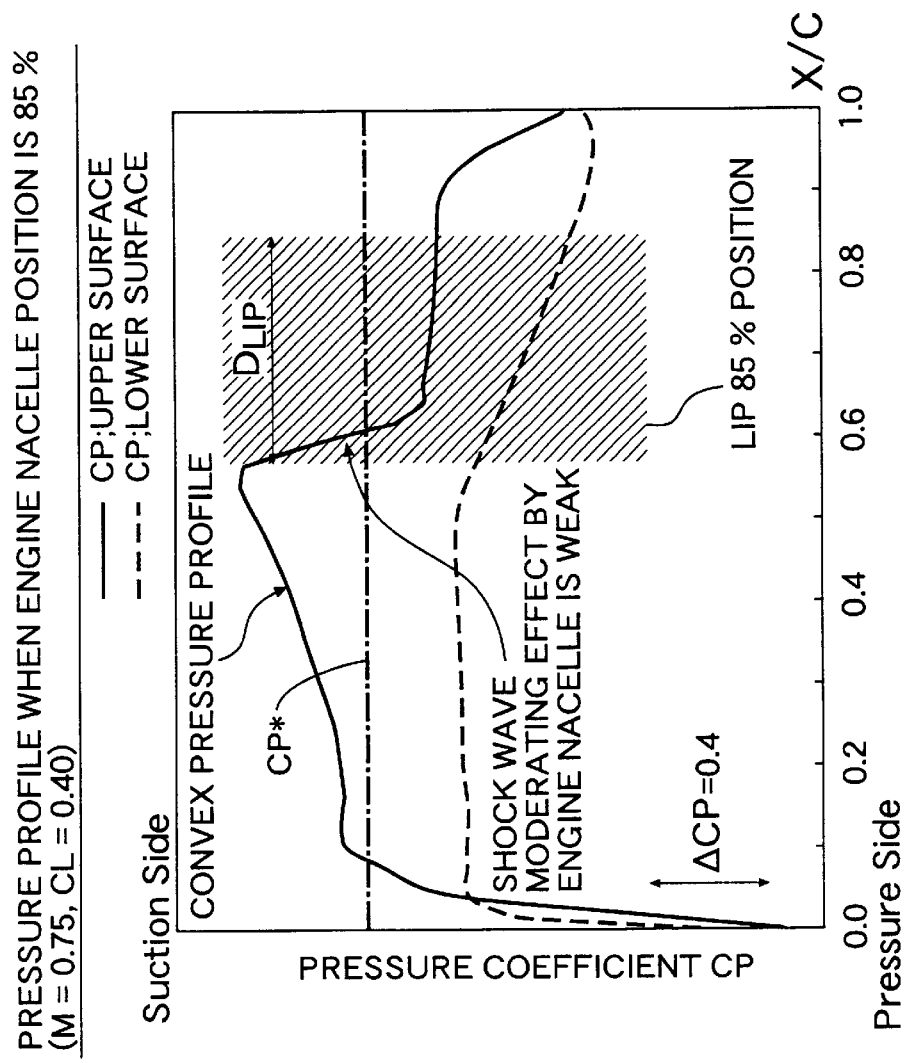
FIG. 14 is a graph showing the pressure profile provided along the wing chord when the engine nacelle position X/C is equal to 85%.

FIG. 14 shows a pressure profile when the front end of the engine nacelle is disposed in the position of X/C=85% on the upper surface of the main wing in a state in which the mach number M is equal to 0.75, and the lift coefficient CL is equal to 0.40. As is apparent by comparison with FIG. 13, the front negative peak is higher and the rear negative pressure peak has disappeared due to the 5% backward-displacement of the position of the engine nacelle, thereby providing an entirely convex profile having a negative pressure peak at a central portion. As a result, a region having a relatively large pressure gradient is produced at near a point corresponding to 60% of the wing chord, but the pressure gradient is smaller as compared with the pressure gradient (see FIG. 10) provided when the engine nacelle is not provided, and the effect of inhibiting the generation of the shock wave is observed for the present.

Figure 15:
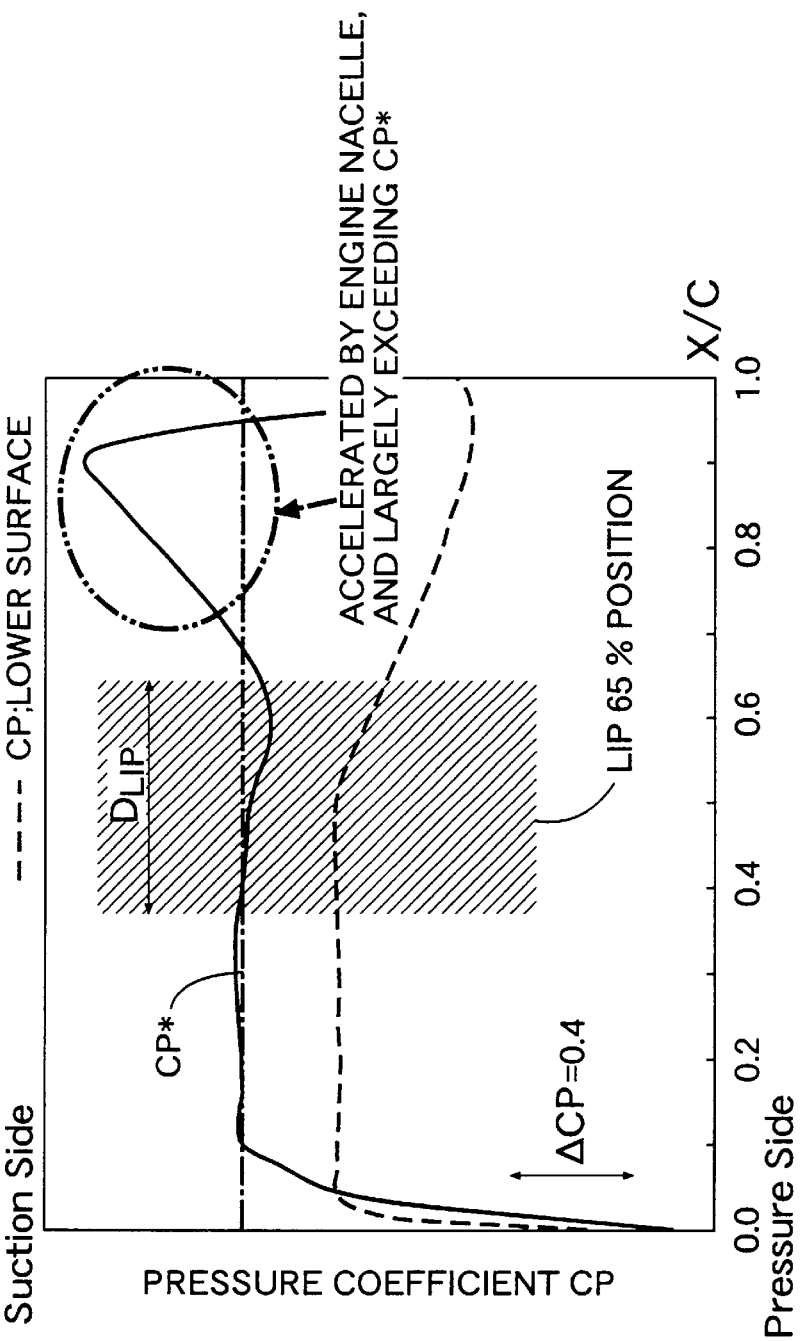
FIG. 15 is a graph showing the pressure profile provided along the wing chord when the engine nacelle position X/C is equal to 65%.

FIG. 15 shows a pressure profile when the front end of the engine nacelle is disposed in the position of X/C=65% on the upper surface of the main wing in a state in which the mach number M is equal to 0.75, and the lift coefficient CL is equal to 0.40. As is apparent by comparison with FIG. 13, it can be seen that a rear intensive negative pressure peak is produced in place of the disappearance of the front negative pressure peak due to the 15% forward-displacement of the engine nacelle position, and the shock wave is generated thereat to decrease the drag emanating mach number $M_{DD}$.

The reason why the generation of the shock wave can be inhibited according to the present invention is considered as described below. If the engine nacelle is disposed on the upper surface of the main wing, the decelerated region (see FIG. 12) of the main flow formed in front of the engine nacelle is superposed onto the air flow on the upper surface of the main wing, and the air flow on the upper surface of the main wing is partially decelerated. Therefore, if the decelerated region in front of the engine nacelle is superposed on the position in which the flow speed of the air flow on the upper surface of the main wing is high, i.e., the position in which the shock wave is generated, the negative pressure in such area can be dropped to the critical pressure coefficient CP* or less to inhibit the generation of the shock wave and the increase in wave resistance and as a result, the drag emanating mach number $M_{DD}$ can be increased.

Thus, according to the present invention, the wave resistance can be decreased without decreasing the thickness of the main wing and without increasing the sweep-back angle of the main wing. Therefore, the cruising speed of the airplane can be increased without bringing about the deterioration of the stalling characteristic and the like during flying the airplane at a lower speed. Moreover, a laminar flow wing profile of a lower resistance can be employed by decreasing the sweep-forward angle of the main wing and hence, the fuel retrenching effect during cruising of the airplane can be further enhanced.

The supporting of the engine on the main wing provides an advantage which will be described below, as compared with the case where the engine is supported on the fuselage. More specifically, the structure for supporting the engine on the fuselage does not pass through the fuselage and hence, a wide space for a cabin can be ensured, also the weight of the structure can be reduced by supporting the engine on the main wing which originally has a higher rigidity, and the flexure moment applied to the root of the main wing by the lift force provided during flying of the airplane can be reduced with the weight of the engine, whereby the weight of the structure can be reduced.

The fluid element is not limited to the engine nacelle N illustrated in the to above embodiment, and may be any element which is capable of generating a decelerated region of a main flow in front of the element. In addition, the pylon P may be mounted on a side of the fuselage F in place of being mounted on the upper surface of the main wing W.

Although the embodiment of the present invention has been described in detail, it will be understood that the present invention is not limited to the above-described embodiment, and various modifications may be made without departing from the spirit and scope of the invention defined in claims.

What is claimed is:

1. A method for reducing a wave resistance in an airplane, which comprises disposing a substantially cylindrical engine nacelle covering a gas turbine engine within a main flow above a rear portion of an air flow on an upper surface of a main wing of an airplane, for generating a negative pressure on the upper surface of the main wing of the airplane cruising at a transonic speed, superposing a decelerated region of the main flow generated in front of the engine nacelle onto the air flow on the upper surface of the main wing to decelerate the air flow on the upper surface of the main wing, defining the negative pressure when the air flow on the upper surface of the main wing becomes sonic speed, as a critical pressure coefficient, establishing on the wing chord a reference point at which the profile of pressure on the upper surface of the main wing is changed from a state equal to or larger than the critical pressure coefficient to a state smaller than the critical pressure coefficient, and disposing a front end of the engine nacelle to the rear of a position in front of the reference point by 5% of the length of the wing chord, thereby reducing the negative pressure on the upper surface of the main wing to inhibit the generation of a shock wave.

2. A method for reducing a wave resistance of an airplane according to claim 1, wherein the longitudinal distance between the front end of the engine nacelle and the front edge of the main wing is in a range of 68% to 100% of the length of the wing chord.

3. A method for reducing a wave resistance of an airplane according to claim 1, wherein the longitudinal distance between the front end of the engine nacelle and the front edge of the main wing is in the range of 75% to 85% of the length of the wing chord.

4. A method for reducing a wave resistance of an airplane according to claim 1, wherein the vertical distance between the lower surface of the engine nacelle and the upper surface of the main wing is decreased with a corresponding increase in longitudinal distance between the front end of the engine nacelle and the front edge of the main wing.

5. A method for reducing a wave resistance in an airplane according to claim 1, wherein the front end of the engine nacelle is disposed between said position in front of the reference point by 5% of the length of the wing chord and a position behind the reference point by a distance equal to the diameter of the lip front edge of the engine nacelle.

6. A method for reducing a wave resistance in an airplane according to claim 1, wherein the vertical distance between the upper surface of the main wing and the lower surface of the engine nacelle is in a range of 30% to 100% of the outside diameter of the engine nacelle.

7. A method for reducing a wave resistance in an airplane according to claim 1, wherein the engine nacelle is supported by a pylon rising from the upper surface of the main wing.

8. A method for determining a position of an engine nacelle in an airplane, which comprises disposing a substantially cylindrical engine nacelle covering a gas turbine engine within a main flow above a rear portion of the air flow on an upper surface of the main wing of the airplane, for generating a negative pressure on the upper surface of the main wing of the airplane cruising at a transonic speed, and superposing a decelerated region of the main flow generated in front of the engine nacelle onto the air flow on the upper surface of the main wing to decelerate the air flow on the upper surface of the main wing, thereby reducing the negative pressure on the upper surface of the main wing to inhibit the generation of a shock wave, the method comprising:

a first step of defining the negative pressure when the air flow on the upper surface of the main wing becomes a sonic speed, as the critical pressure coefficient, and establishing on the wing chord a reference point at which the profile of pressure on the upper surface of the main wing is changed from a state equal to or larger than the critical pressure coefficient to a state smaller than the critical pressure coefficient; and a second step of disposing a front end of the engine nacelle to the rear of a position in front of the reference point by 5% of the length of the wing chord.

9. A method for determining the position of an engine nacelle in an airplane according to claim 8, wherein said second step disposes the front end of the engine nacelle between said position in front of the reference point by 5% of the length of the wing chord and a position behind the reference point by a distance equal to the diameter of the lip front edge of the engine nacelle.

* * * * *